United States Patent [19]

Redwine

[11] Patent Number: 4,545,404
[45] Date of Patent: Oct. 8, 1985

[54] BONDED VALVE WITH REPLACEABLE INSERT

[75] Inventor: Fletcher H. Redwine, Garland, Tex.

[73] Assignee: United States Steel Corporation, Pittsburgh, Pa.

[21] Appl. No.: 700,149

[22] Filed: Feb. 11, 1985

Related U.S. Application Data

[63] Continuation of Ser. No. 474,082, Mar. 10, 1983, abandoned.

[51] Int. Cl.$^4$ ............................................. F16K 15/06
[52] U.S. Cl. ................................ 137/516.29; 251/332; 251/368; 137/902
[58] Field of Search ...................... 251/332, 368, 357; 137/516.29, DIG. 3

[56] References Cited

U.S. PATENT DOCUMENTS

| | | | |
|---|---|---|---|
| 1,963,685 | 6/1934 | Shimer | 137/DIG. 3 |
| 2,255,404 | 9/1941 | White et al. | 137/DIG. 3 |
| 2,417,494 | 3/1947 | Hoof | 251/332 |
| 3,070,120 | 12/1962 | Wendt | 137/516.29 |
| 3,290,001 | 12/1966 | Taylor | 251/332 X |
| 3,324,880 | 6/1967 | Roberts et al. | 137/516.29 |
| 3,897,043 | 7/1975 | McBain et al. | 251/368 X |
| 4,129,144 | 12/1978 | Andersson et al. | 137/516.29 X |

*Primary Examiner*—Arnold Rosenthal
*Attorney, Agent, or Firm*—William F. Riesmeyer

[57] ABSTRACT

The invention is of a valve member having a replaceable deformable insert installed in a groove of the member and a deformable backup member secured to the valve member, preferably by bonding, and abutting so as to abut at least a major portion of a transverse surface of the insert opposite a tapered seating surface thereof. The insert may be of harder more wear resistant material than the backup member extending service life and permitting easier repair or replacement of the insert.

6 Claims, 1 Drawing Figure

U.S. Patent  Oct. 8, 1985  4,545,404
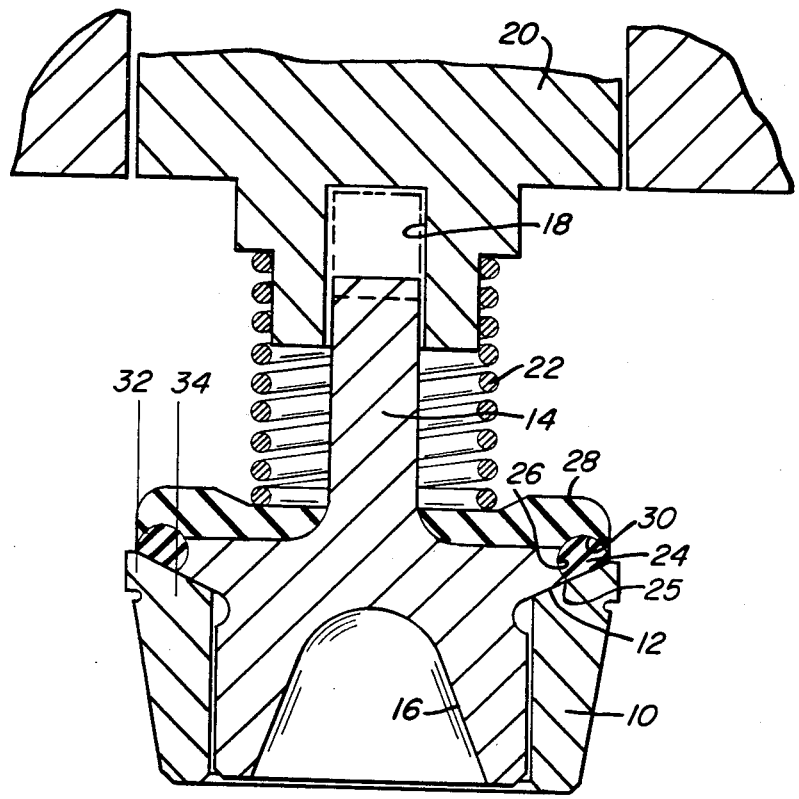

BONDED VALVE WITH REPLACEABLE INSERT

This is a continuation of application Ser. No. 474,082, filed Mar. 10, 1983 now abandoned.

BACKGROUND OF THE INVENTION

The present invention relates to an improvement in poppet-type valves, and particularly to those having replaceable deformable sealing inserts.

Valves used in oil well mud pumps are subject to severe abrasion and wear. The sealing element in such valves may need to be replaced after only a few hours of service. In some designs the sealing element is mechanically fastened so that it may be replaced separately. However, the mechanical fasteners tend to fail, for example, through loosening of a threaded element or a snap ring. A lower cost fastening method is provided by bonding the sealing element to a metal valve member. But this does not permit separate replacement of the sealing element. Another disadvantage is that materials which bond well do not have the best wear resistance.

It is a primary object of the present invention to provide a poppet-type valve member having a replaceable insert of deformable material which is attached in a manner significantly extending its service life.

SUMMARY OF THE INVENTION

According to the present invention, an improvement is provided in poppet-type valve members which have a replaceable insert of deformable material installed in a groove in the member. A deformable backup member is provided abutting at least a major portion of a transverse surface of the insert opposite from a tapered seating surface thereof. The extent of the transverse surface of the insert is defined by boundaries located in a direction parallel to the axis of the valve member from opposite outermost ends of the tapered surface of the insert. Preferably, the backup member is bonded to the metal valve member by conventional techniques and provides sole support for the aforementioned transverse surface of the insert in a direction parallel to the axis of the valve member. It is desirable that the insert be of material having a higher durometer hardness than the backup member, particularly if the backup member is bonded to the metal valve member. The wear resistance of the insert is increased to an even greater degree than would be expected based on its increased hardness. This is apparently due to a cushioning effect of the softer backup material. For valves to be used in mud pumps, the insert is preferably of polyurethane material, while the backup member is preferably of nitrile rubber. Valves for high temperature service and requiring greater chemical resistance may have inserts of teflon and backup members of viton material. Many other deformable materials would be suitable for use as inserts or backup members.

BRIEF DESCRIPTION OF THE DRAWINGS

The sole FIGURE is a cross-section of a mud pump valve showing the preferred embodiment of the invention.

DESCRIPTION OF THE PREFERRED EMBODIMENT

The sole FIGURE shows a poppet-type valve used in oil well mud pumps. The valve includes a metal seat member 10 having an annular tapered seating surface 12. A reciprocable member 14 having wing guides 16 is slidably mounted in a passage 18 of valve cover 20. The reciprocable member may have a stem guide in place of the wing guides. Coil spring 22 urges member 14 into closed position. Deformable insert 24 has a surface of generally mateable taper with the seating surface 12 for making sealing contact therewith. The insert is of polyurethane material having a durometer hardness of between 80 to 95. It fits into peripheral annular groove 26 in the reciprocable member. The insert ring is designed to have ⅛ inch diametral stretch so that it may be removed and replaced easily.

The groove 26 is of a circular arc-shape which is mateable with a circular arc-shaped surface of insert 24. This feature permits rotation of the insert upwardly (in the drawing) to a slight degree when the reciprocable valve member contacts the seat member. Rotation of the insert provides a significant advantage in that nibbling of the insert is prevented at the jointure 25 between the tapered surfaces of the insert and the reciprocable valve member. This significantly extends the service life of the insert. Nibbling is the breaking away of pieces of the insert when portions of it become squeezed between the metal seating surfaces at the jointure 25 just mentioned. This squeezing action occurs because the tapered metal surfaces wear away faster than the insert, increasing the amount of overhang of the insert downwardly (in the drawing) past the jointure 25. The holes left in the insert due to nibbling trap fluid in them upon closure of the valve. This fluid tends to squish out between the metal seating surfaces to the lower pressure area of the valve causing erosion of the metal seating surfaces. The result is more rapid failure of both the insert and the metal valve members. The slight upward rotation of the insert in the valve of this invention eliminates the progressive increase in overhang which normally occurs as the metal surfaces wear away. In fact it has been found when the valves of this invention are removed from service, that rotation of the insert completely eliminates overhang of the insert beyond the metal surfaces of the valve. A deformable backup member 28 is provided for abutting at least a major portion of a transverse surface of the insert which is located opposite from the tapered seating surface of the insert. The transverse surface of the insert preferably is of circular-arc shape, being a continuation of the curvature of the arc of groove 26 in the reciprocable valve member and adapted to fit mateably in groove 30 of the backup member. The extent of the transverse surface of the insert is defined by the length of that surface between boundaries intercepted by direction lines 32, 34 passing through upper and lower ends of the tapered surface of the insert, said directions being parallel to the axis of the reciprocable valve member. Backup member 28 is of nitrile rubber material having a durometer hardness of 75 to 85, and is bonded to the back face of member 14. The same bonding techniques are used to secure member 14 as are now used in molding conventional bonded insert types of valves. The backup member could be mechanically attached, but this is not preferred. The backup member has a groove 30 which is of circular arc shape of the same radius as the arc of the groove in the insert. Many other shapes of groove may be used, both in the insert and backup member. The thickness of the insert and backup member in the axial direction of the valve are generally about equal. However, the backup member may be two to three or more times thicker than the insert if desired.

I claim:

1. In a poppet-type valve, said valve including a reciprocable metal valve member and a metal seat member, said members having mateable tapered annular seating surfaces for making sealing contact, said reciprocable valve member having a replaceable insert of elastomeric material installed in a groove in said reciprocable member, said insert having a tapered annular seating surface for making sealing contact with the seating surface of said metal seat member, the improvement in said poppet-type valve which comprises:

said reciprocable metal valve member having an outer annular groove of circular arc-shape, said elastomeric material having a circular arc-shaped surface mateable with the groove in said reciprocable metal valve member, said elastomeric insert being adapted to be received in the groove of said valve member, said reciprocable metal valve member having an elastomeric backup member bonded to a transverse metal surface of said reciprocable member, opposite from the tapered annular seating surface of said reciprocable valve member, said elastomeric insert having a higher durometer hardness than said elastomeric backup member, said backup member abutting at least a major portion of a transverse surface of said elastomeric insert at a location opposite the tapered seating surface of said insert, the extent of said transverse surface of the insert being defined by boundaries intercepted by directions parallel to the axis of said reciprocable valve member through upper and lower ends of the tapered surface of said insert as viewed in an axial cross-section of said reciprocable valve member.

2. The valve of claim 1 in which said insert and backup member have durometer A hardness within the range of from about 80 to about 95 and from about 75 to about 85, respectively.

3. The valve of claim 1 in which said insert and backup member are of polyurethane and nitrile rubber material, respectively.

4. The valve of claim 1 in which the durometer A hardness of said insert is at least five (5) units greater than that of the backup member.

5. The valve of claim 1 in which the transverse surface of said insert is of circular arc-shape, being a continuation of the curvature of the outer annular groove of said reciprocable valve member, said deformable backup member having a mateable groove of circular arc-shape for abutting the transverse surface of said insert.

6. The valve of claim 5 in which said deformable backup member abuts at least 90% of the transverse surface of said insert.

* * * * *